United States Patent Office 3,158,632
Patented Nov. 24, 1964

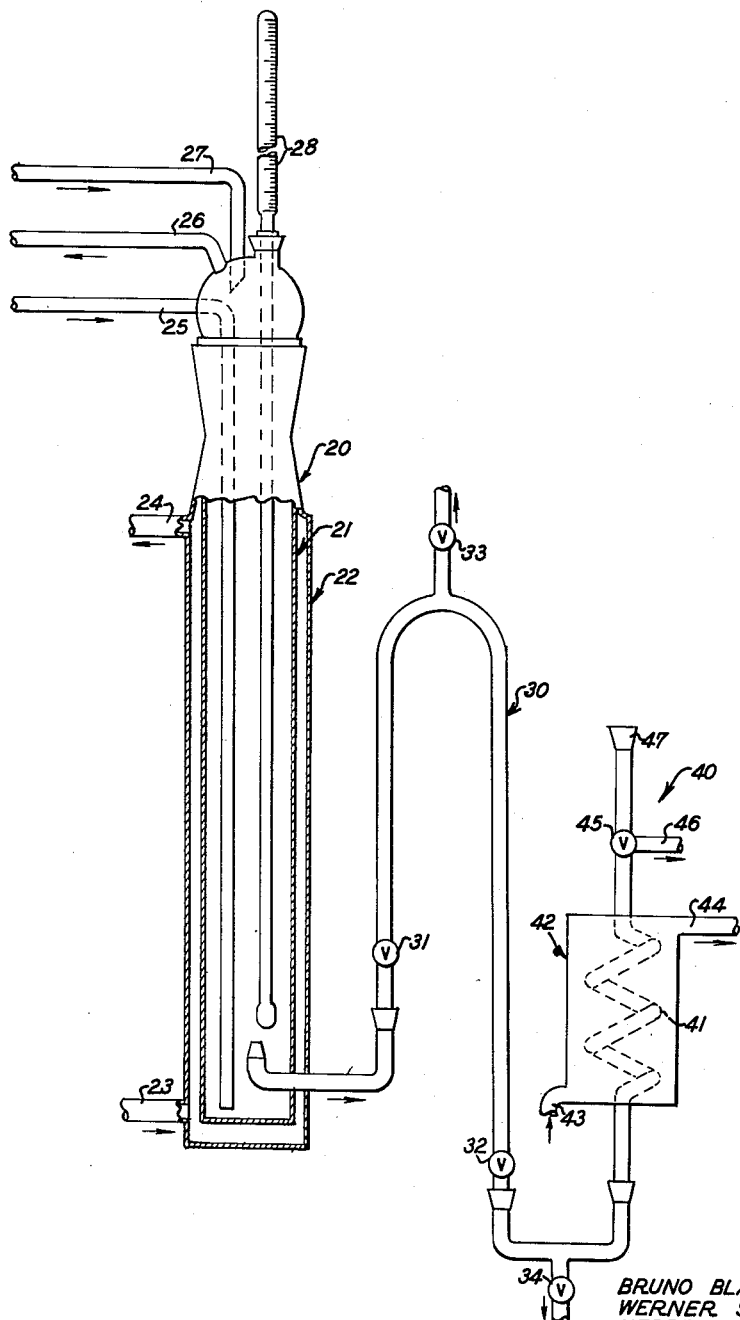

3,158,632
α-SULFONATION OF SATURATED FATTY ACIDS AND THEIR DERIVATIVES
Bruno Blaser, Dusseldorf-Urdenbach, Werner Stein, Dusseldorf-Holthausen, Herbert Weiss, Cologne-Deutz, and Otto Koch, Hilden, Rhineland, Germany, assignors to Henkel & Cie. G.m.b.H., Dusseldorf-Holthausen, Germany, a German corporation
Filed May 15, 1962, Ser. No. 194,786
Claims priority, application Germany Aug. 3, 1961
9 Claims. (Cl. 260—400)

This invention relates to new and useful improvements in the sulfonation of fatty acids and their derivatives. The invention more particularly relates to an improved process for sulfonating fatty acids or their derivatives, such as their esters or nitriles, using an excess of sulfur trioxide gas as the sulfonation agent.

Sulfonates of fatty acids and of fatty acid derivatives, such as esters or nitriles, constitute commercially valuable materials due to their surface-active characteristics and resistance to hard water which render the same suitable as detergents and wetting agents. These sulfonates are conventionally produced by the sulfonation of the corresponding fatty acids or fatty acid derivatives. When sulfonating these materials using an excess of gaseous sulfur trioxide, the reaction products produced were dark colored, brown-black products which, due to this discoloration, were unsuitable for commercial use. While it was possible to obtain somewhat lighter colored products by operating under milder conditions of temperature, as for example 60–65° C., the use of these temperatures could not produce the satisfactory degree of sulfonation, and when the temperature was increased, in order to obtain more completely sulfonated products, then the darker colored reaction products were produced. While it was possible to recover utilizable sulfonates from these dark colored reaction products by recrystallization thereof in the form of their alkali metal salts, this increased the production costs and presented technical difficulties.

One object of this invention is the obtaining of lighter-colored reaction products, after the extensive sulfonation of fatty acids or their derivatives, using gaseous sulfur trioxide, as the sulfonation agent.

These and still further objects will become apparent from the following description read in conjunction with the drawing which diagrammatically shows an embodiment of an apparatus for effecting the process in accordance with the invention.

It has now been surprisingly found that lighter colored reaction products may be obtained in the sulfonation of fatty acids and their derivatives, such as their esters and nitriles, using an excess of gaseous sulfur trioxide as the sulfonation agent if this excess of sulfur trioxide is initially dissolved in the starting material at a temperature below the temperature of effective sulfonation and if, thereafter, the temperature is raised, preferably slowly to a temperature at which effective sulfonation takes place but not in excess of about 70° C., and if this temperature is maintained until at least half of the starting material has been sulfonated, and then the temperature is again increased to above 70° C. to complete the sulfonation. The temperature below the temperature of effective sulfonation is a temperature at which the sulfonation will not proceed or will only proceed slowly but not at what would be considered a commercially effective rate. This temperature is generally a temperature below about 45° C., and the initial mixing is preferably effected at a temperature between about 10–45 and most preferably between about 20–35° C. After the initial mixing at this temperature, the temperature is preferably increased within the temperature range of 45–70° and preferably at a temperature up to 65° until at least half and preferably about 60–80% of the starting materials has been sulfonated. For the completion of the sulfonation the temperature is raised within the range of 75–95 and preferably 80–90° C. The total quantity of sulfur trioxide used for the sulfonation generally amounts to 1.1–1.8 and preferably 1.2–1.6 mols of sulfur trioxide per mol of fatty acid radical to be sulfonated, and this entire quantity is initially added at the temperature below the temperature of effective sulfonation. The sulfur trioxide is preferably added diluted with an inert gas, but the same must be in its free form and may not, for example, be in the form of a complex or adduct with a solvent.

The starting materials processed, in accordance with the invention are fatty acids or their derivatives, such as esters or nitriles which may be of any origin and contain fatty acid radicals with 6–28 and preferably 8–18 carbon atoms. These fatty acid radicals may come from the natural fats of plants, land- or water animals. Through selection of the starting fats it is possible to extensively influence the properties of the sulfonates to be produced. Thus from the fats, which predominantly contain fatty acids with 10–14 carbon atoms per fatty acid radicals, such as from the fats of the lauric acid group, which are particularly rich in fatty acids with 12 carbon atoms, products which are soluble at lower temperatures of, for example 20–45° C. are obtained, while from other fats which predominantly contain fatty acids with 16–18 and more carbon atoms per fatty acid radical, for example from other plant fats than the above named, or from tallow or from whale and fish oils, products are obtained which are particularly well suited for use at temperatures within the range of 50–100° C.

These starting materials, i.e. the fatty acids and their derivatives, such as their esters or nitriles should not contain apart from the alpha-position hydrogen atom, other sulfatizable or sulfonatable groups, such as for example double-bonds or alcoholic hydroxyl groups. The fatty acid esters to be processed in accordance with the invention may be derived from mono- or poly-valent alcohols, particularly from mono- to tri-valent alcohols, and, as mentioned above, must not contain any alcoholic hydroxyl groups or other sulfatizable or sulfonatable groups. As far as the fatty acid esters of monovalent primary aliphatic alcohols are concerned, the radical may contain 1–20 carbon atoms in the molecule. Thus for example, the esters of fatty acids with methyl to nonyl-alcohols may be used. It is also possible to use fatty acid esters which contain radicals of such still higher alcohols in the molecule as for example, are produced by reduction of the initially mentioned fatty acids or fatty acid mixtures, or synthetically in some other manner. Examples of readily available esters of fatty acids with higher fat alcohols include the hydrogenation products of the oleyloleate occurring in the sperm oil or the naturally occurring or synthetically produced wax esters.

Many fats, particularly those of natural origin and the fatty acids and their derivatives produced therefrom often contain accompanying substances, which, upon sulfonation produce strongly colored decomposition products. Although it is also possible to bleach these decomposition products according to a process mentioned hereinafter, it is advisable not to burden the sulfonation and the bleaching process through the decomposition products of such accompanying substances, which may be forthwith removed from the fats and/or the therefrom produced fatty acids or their derivatives before the sulfonation. Examples of products which give with the sulfonation agent strongly colored impurities include unsaturated fatty acids or fatty-acid derivatives. Therefore, the fats to be processed are to be, as far as possible, extensively saturated, i.e., they are to have iodine numbers below 5, preferably below 2.

The starting fatty acids to be sulfonated are preferably in the form of distillates as are the fatty acid derivatives, insofar as these are distillable under the technical prerequisites in each case. If distillation is not practical on account of a high boiling point or for other reasons, such as for example in the case of triglycerides, then it is advisable to initially remove the impurities present in the starting material to be sulfonated in another manner. Thus, for example, in the case of the natural fats, and particularly the natural triglycerides, albuminous substances and slimy substances (mucins) should be separated in the deacidification and refining of the oils in a manner known per se.

The starting materials are preferably used alone rather than diluted with inert solvents though inert solvents, i.e. solvents that will not combine with the $SO_3$ may be used, as for example in connection with the sulfonation of materials such as fatty acid esters of polyvalent alcohols and particular triglycerides which show a strong increase in viscosity during the sulfonation. These materials may be used diluted with an inert solvent, as for example, perchloroethylene.

Even, however, when processing the materials, such as the triglycerides which show marked increase in viscosity during the sulfonation, it is not necessary, in accordance with the invention to use such an inert solvent as the sulfur trioxide is added before the sulfonation proceeds, and thus before the viscosity increase occurs.

As has been mentioned, an excess quantity of the sulfur trioxide is used for the sulfonation, i.e. an amount greater than the molar quantity required for the sulfonation of the fatty acid radicals to be sulfonated and this amount of sulfur trioxide is generally between about 1.1–1.8 and preferably 1.2–1.6 mols of sulfur trioxide per mol of fatty acid radical.

The sulfur trioxide must be used as a free gas, i.e. in an unbound form as for example in the absence of complex forming substances, such as complex forming solvents. The sulfur trioxide gas is preferably, however, diluted with an inert gas, as for example air, nitrogen, carbon dioxide, and the sulfur dioxide inert gas mixture may, for example contain 2–40 and preferably 3–20 volume percent of sulfur trioxide.

The process in accordance with the invention may be considered as involving three phases, the first constituting the dissolving of the sulfur trioxide required for the reaction in the starting material at the temperature below the temperature of effective sulfonation. The second phase is the raising of the temperature to an effective sulfonation temperature not in excess of about 70° C. and the maintaining of the temperature within this range until at least half of the sulfonation has occurred. The third and final phase is the raising of the temperature to above 70° C. for completion of the sulfonation. These phases may merge smoothly, one into the other, and in accordance with the preferred mode of operation, at least the first two phases so merge. There is, of course, no sharp temperature boundary between sulfonation and non-sulfonation and the rate of sulfonation increases with the temperature. For all practical purposes, however, the temperature of 30° C. may be considered as a temperature below which the sulfonation will not proceed, and a temperature of 45° may be considered the temperature below which the sulfonation will not proceed at a rate of any practical importance. Thus, if the sulfur trioxide is dissolved at a temperature between about 10–30° C., the same may be considered as being dissolved at a temperature at which no sulfonation will occur. In accordance with the invention, however, it is possible to initially dissolve the sulfur trioxide at temperatures below 45° C. as for example between 25 and 45° C.

As heat is liberated upon the dissolving of the sulfur trioxide, in the starting material to be sulfonated, it may be necessary, in order to maintain the temperatures in the ranges indicated, to cool the reaction but the temperature may be very easily controlled, particularly with the sulfur trioxide added in a form diluted with inert gases.

After the addition of the excess quantity of the sulfur trioxide, the temperature gradually rises and must be controlled so that this rise does not exceed 70° C. until a degree of sulfonation of the starting material of at least 50% and preferably 60–80% is reached.

After this degree of sulfonation has been reached, the reaction temperature is then allowed to exceed 70° C., as for example by external heating, but in general should not be allowed to exceed about 100° C. Preferably the maximum temperature should range between about 75–95 and preferably 80–90° C.

The time during which the sulfonation is effected at a temperature above 70° C. should preferably be maintained as short as is possible and should not amount to more than ⅓ of the entire reaction time. The entire reaction time may be considered that period in which the starting material is in contact with the sulfur trioxide at a temperature of 30° C. or above until the termination of the reaction, as for example upon cooling or the addition of further reactants for reaction with the sulfur trioxide. In the majority of cases, the phase of the reaction which is carried out at temperatures of above 70° C. varies between about 5 and 60 minutes, the exact time being strongly dependent upon the temperature. Thus, for example, at temperatures around 90° C., a 5–15 minute reaction time may be sufficient whereas at temperatures around 75° C., a reaction time as high as 60 minutes may be required.

After the reaction is completed, the reaction product is processed in the well-known conventional manner. In general, the reaction is terminated by cooling.

The products obtained in accordance with the invention are sometimes still colored brown. However, they contain, assuming comparable conditions, such as for example equal degrees of sulfonation and equal sulfonation agent excesses, much less colored impurities than the products produced according to known processes. They may thus be converted with much smaller bleaching agent quantities into light-colored unobjectionable products.

The bleaching of the acid sulfonation products may be carried out according to co-pending application Serial No. 194,998 filed the same day herewith by treatment with hydrogen peroxide in amounts of 0.2–6 weight percent and preferably 1–4 weight percent hydrogen peroxide, calculated as 100% product. With the sulfonation products, in accordance with the invention, it is possible to manage in general with less than 4% and frequently less than 3% so far as the processed starting materials did not contain any impurities of accompanying substances, forming in the sulfonation colored decomposition products. The hydrogen peroxide is preferably charged as 20–75 weight percent product and particularly as 30–50 weight percent product. Furthermore, it is advisable to so choose the concentration of the hydrogen peroxide to be used in dependence on its quantity that the sulfuric acid, formed at the start of the bleaching process from free sulfur trioxide and the water quantity introduced with the hydrogen peroxide, is not more diluted than a 20% sulfuric acid. Preferably this sulfuric acid, mathematically considered, should represent a mixture of sulfur trioxide and water with a sulfur trioxide content up to 95 weight percent and preferably up to 90–50 weight percent. The bleaching is effected at temperatures within the range of 20–100 and preferably of 40–80° C.

Insofar as fatty acids are sulfonated in accordance with the invention, the products produced may be converted into esters in a manner known per se. As esterification components the mono- or polyvalent alcohols present as alcohol components in the initially mentioned fatty acid esters may be used. This esterification is desirable above all for the production of the esters from sulfo-carboxylic acids and mono-valent alcohols containing at least 6 carbon atoms because the esters per se when used as starting materials for the sulfonation react slower within increasing magnitude of the alcohols radical and good degrees of sulfonation are obtainable only with greater quantities of sulfur trioxide.

The esterification of the acid sulfonation products may take place before or after the bleaching. If the bleached sulfo-fatty acids are used, then the mono-salts neutralized at the sulfo-acid group may also be processed.

An embodiment of a device suitable for effecting the process in accordance with the invention is shown in the accompanying drawing. The device consists of an absorption or reaction vessel 20 and a temperature control or a heat exchange device 40 which are inter-connected by means of a line 30. The absorption or reaction vessel 20 consists of the interior vessel 21 which is surrounded by the temperature jacket 22 with the inlet 23 and discharge 24 for the heat exchange liquid. The starting material is introduced through the nozzle 27 while the sulfur trioxide inert gas mixture is conducted through the line 25 under the surface of the starting material present in the vessel 21. The inert gas, practically free of sulfur trioxide, passes out at 26 and the temperature in the reaction vessel may be ascertained by means of the thermometer 28 which may also be developed as a thermostatic control as for example for controlling the flow of the heat exchange liquid. The starting material to be sulfonated containing the sulfur trioxide is drawn off from the bottom of the absorption vessel through the line 30. The flow through the line 30 may be controlled by means of the valves 31 and 32. The line 30 is developed as an inverted U or syphon and a gas release 33 is developed at its highest point while the discharge cock 34 is positioned at its lowest point.

The heat exchanger 42 is provided with the coil 41 passing through the vessel proper which is developed as a jacket provided with the inlet 43 and an outlet 44. The material passing through the coil 41 may be discharged by way of the three-way stop cock 45, either through the discharge 46 or conducted through the nozzle 47 into a further heat exchange device of similar construction.

In operation, the reactants, i.e. the fatty acid or fatty acid derivatives to be sulfonated and the $SO_3$ are introduced into the vessel 21 which, by means of the jacket 22 is maintained at a temperature below the temperature of effective sulfonation. After the introduction of the $SO_3$ gas, by a suitable control of the temperature of the heat exchange liquid passed in through 23 and out through 24, the temperature may be allowed to rise to above the effective sulfonation temperature but below 70° C. and after at least half of the material has been sulfonated, the same may be passed through the line 40 and coil 41 and the temperature allowed to rise to above 70 for completion of the sulfonation. In this case, the vessel 21 acts as an absorption and reaction vessel.

Alternately, the temperature in the vessel 21 may be maintained below the effective sulfonation temperature so that the same merely acts as an absorption vessel. Thereafter, a fatty acid or fatty acid derivative with the absorbed $SO_3$ is passed through the coil 41 with a temperature rise to above the effective sulfonation temperature but below 70° C., and after at least 50% of the sulfonation has been completed in this coil, the same is passed through a further series connected heat exchanger where the temperature is allowed to rise to above 70° C. for the completion of the sulfonation.

The following examples are given by way of illustration and not limitation:

Example 1

For the carrying out of the process described in this example, the device shown in the drawing was used, with, however, three heat exchange devices 40 connected in series behind one another.

As starting material a lauric acid-methyl ester (iodine number=0.1) distilled out from the mixture of the ethyl esters of hardened coconut oil acid was used. 104 g. sulfur-trioxide (1.3 mol), diluted with 600 l. air, were blown in and dissolved in 124 g. (1 mol) of the ester in the vessel 21 over the course of 130 minutes and at a temperature of 30°C.

After this quantity was dissolved, the processes were run as a continuous operation by feeding 115 g. ester and 56 g. sulfur trioxide, diluted with 95 volume percent air, per hour, and simultaneously drawing off 171 g. reaction mixture per hour. The reaction mixture was conducted through the three heating coils, which had been heated to temperatures of 50, 80 and 85°. The median time of stay of the ester in the absorption vessel 21 amounted to 2 hours, with time of stay in each reaction coil being about 20 minutes. Samples continuously taken after the first reaction coil showed a degree of sulfonation of 72%. The ester emerging from the last reaction coil was cooled, then bleached with 1.6% of its weight $H_2O_2$ (as 40% aqueous solution) for 2 hours at temperatures of 50–60° C., and thereupon neutralized with 15% sodalye. The sulfonate obtained had a degree of sulfonation of 95%; a 5% solution of the sulfonation product showed in the Lovibond-Tintometer in a 4" cell, the following color values: yellow: 12; red: 3.0; blue: 0.0.

Example 2

Example 1 was repeated using, however, only 1.2 mol sulfur trioxide per mol of ester. The degree of sulfonation of the product was, after the first reaction coil, 65%. The temperature of the product in the last reaction coil was 90° C. The degree of sulfonation of the end product was 95%. The color of the bleached product was practically the same as that of the product obtained according to Example 1.

Example 3

As starting material an ethyl ester of the hardened fatty acids of the coconut oil (iodine number=0.5) purified through distillation was used. The manner of operation of Example 1 was repeated with, however 1.13 mol sulfur trioxide per mol of ester.

The temperature in the first reaction coil was 55°, the degree of sulfonation of the product after the first reaction coil was 62%. The two following reaction coils were heated to 80 and/or 90° C. The emerging sulfonation product (degree of sulfonation: 92%) was bleached after cooling with 3% of its weight of $H_2O_2$ (as 40% aqueous solution) for 2 hours at 55–60° C., and then neutralized with 10% soda lye. A 5% solution of the sulfonate showed in the Lovibond-Tintometer, measured in a 4" cell, the following color values: yellow 7.0; red: 1.3; blue: 0.0.

Example 4

Example 3 was repeated but the mol ratio sulfur trioxide: ester was increased to 1.3:1. The degree of sulfonation of the product amounted to 96.5%. The acid sulfonation product was bleached with 3% of its weight of $H_2O_2$ (as 40% aqueous solution) for 2 hours at temperatures of 55 to 60° C. The color values measured in the Lovibond-Tintometer in a 4" cell were: yellow: 12.0; red: 1.7; blue: 0.0.

Example 5

A secondary butylester (iodine number 0.3), produced from hardened fatty acids of the coconut oil, was sulfonated in the manner described in Example 1. Using 1.6 mol SO$_3$ per mol ester, the temperature in the first reaction coil was 60° C., in the two following coils was 80 and 90° C. respectively. In the transistion from the first to the second reaction coil, a degree of sulfonation of 60% had been reached. The resulting acid crude sulfonation product was treated in the cold with 4% of its weight H$_2$O$_2$ (used as 40% aqueous solution), heated for 2 hours to 50 to 60° C. and then neutralized with 10% soda lye. The degree of sulfonation of the product amounted to 95%. The color values measured in a 4″ cell were: yellow: 6.0; red: 0.9; blue: 0.0.

*Example 6*

A mixture of 1440 g. caprylic acid and 2300 g. methyl ester of a hardened palm-kernel-fatty acid (iodine number of the mixture=0.2) was sulfonated in the manner described in Example 5 using 1.3 mol SO$_3$ per mol mixture. After leaving the first reaction coil, the degree of sulfonation of the product amounted to 65%. The product bleached with 3% of its weight of H$_2$O$_2$, under the conditions indicated in Example 5, had after the neutralization, the following Lovibond color values: yellow: 18; red: 4.5; blue: 0.0. The degree of sulfonation amounted to 96%.

*Example 7*

Caprylic acid was sulfonated in the manner described in Example 5 with 1.26 mol sulfur trioxide. After bleaching, with 4% H$_2$O$_2$ as described in Example 5, the product neutralized with aqueous 8% soda-lye had the following Lovibond color values: yellow: 27; red: 6.0; blue: 0.0. The degree of sulfonation amounted to 95%.

*Example 8*

The parts *a* and *b* of this example demonstrate a continuous manner of operation outside of the scope of the invention for comparison with part *c* in accordance with the invention. As starting material an ethyl ester (iodine number=0.2), produced from hardened fatty acids of the palm-kernel fat was used. The tests described under *a*, *b*, and *c* were carried out in the same apparatus, however, in the tests *a* and *b* all parts of the apparatus were kept at the temperature there indicated.

(*a*) 230 g. (0.92 mol) ester were fed into the reaction vessel and heated to 65° C. Then, 96 g. (1.3 mol) sulfur trioxide, diluted with a 20-fold quantity of air were blown in within 100 minutes. As soon as this sulfur trioxide quantity had been taken up, 125 g. ester per hour were added drop by drop and so much sulfur trioxide air mixture introduced that 1.3 mol sulfur trioxide were taken up per mol ester. 177 g. reaction mixture per hour flowed off from the apparatus. From time to time the receiver was changed and degree of sulfonation and color values determined. The degree of sulfonation lay during the entire running time between 82 and 83.5%. However, the depth of color continuously increased and an end value was reached after six hours of operation.

(*b*) The test described under (*a*) was repeated. However, the temperature was increased to 85° C. The degree of sulfonation of the product amounted to 94–95%. Also here the color intensity increased in the course of the carrying out of the test.

(*c*) The ester was sulfonated with the same sulfur trioxide excess as under (*a*) and (*b*). However, the temperatures in the apparatus parts were adjusted as indicated in Example 1, i.e. the three heating coils were kept at temperatures of 50, 80 and 85°. The degree of sulfonation of the product after leaving the first reaction coil lay between 70 and 75%, that of the end product during the entire carrying out of the test at 95%.

Samples of the products obtained after 6 hours of carrying out of each of the process *a*, *b*, and *c*, were bleached with 2% H$_2$O$_2$ (used as 40% aqueous solution) for 8 hours at 30–40°. Unbleached as well as bleached products were neutralized in order to measure the color values of both. It was found that the color values of the crude products obtained according to (*a*) and (*b*) could not be measured either in a 4″ cell or in a 2″ cell. The product produced according to (*c*) had as 5% solution in a 4″ cell, the following color values: yellow: 27, red: 27; blue: 7.0. The products neutralized after bleaching with 2% H$_2$O$_2$ showed as 5% aqueous solution of the sulfonate in a 4″ cell, the following color values:

| Products produced according to— | Color values of the bleached products | | |
|---|---|---|---|
| | Yellow | Red | Blue |
| (*a*) | 13.0 | 2.4 | 0.0 |
| (*b*) | 17.0 | 3.1 | 0.0 |
| (*c*) | 8.0 | 1.5 | 0.0 |

*Example 9*

Into 126 g. of an ethyl ester (iodine number =0.3) produced from hydrogenated palm kernel fatty acid, 52 g. sulfur trioxide, diluted with the 20-fold quantity of air, were introduced within 15 minutes at 25–30° C. After the introduction, the mixture was heated within 10 minutes to 60° C. The degree of sulfonation of the product then reached amounted to 65%. Then, the temperature was increased within 20 minutes to 80° and held for 30 minutes at 80°. The crude sulfonation product was bleached with 3% of its weight quantity of H$_2$O$_2$ (used as 40% aqueous solution) for 8 hours at 30–40° C., and then neutralized with 8% soda-lye. In a 5% solution, of the sulfonate, the following Lovibond color values were measured in a 4″ cell: yellow: 1.2; red: 0.1; blue 0.0. The degree of sulfonation amounted to 95%.

*Example 10*

Into 113 g. of a hydrogenated palm-kernel fatty acid (iodine number=0.2) at a temperature of 40–45° C., 52 g. sulfur trioxide, diluted with a 20-fold air quantity were blown in within a period of 15 minutes. The mixture was then heated in the course of 20 minutes to 65° wherein a degree of sulfonation of 60% was reached. The temperature was raised in further 20 minutes to 80° C. and then held for one hour at 80° C. The product was bleached with 3% of its weight of H$_2$O$_2$ as 40% aqueous solution for 8 hours at 30–40° C. The product neutralized with diluted soda lye had a degree of sulfonation of 90% and showed the following Lovibond color values: yellow: 27; red: 11; blue: 0.5.

*Example 11*

Into 111 g. hydrogenated coconut oil (iodine number =0.3), 52 g. sulfur trioxide, diluted with a 20-fold air quantity, were introduced in the course of 30 minutes at 45–50° C. Then, the temperature was raised within 15 minutes to 65° C. wherein a degree of sulfonation of 75% was reached. Subsequently, the temperature was raised to 80° C. and held for one hour at this value. The crude sulfonation product was bleached, as described in the preceding examples with 3% H$_2$O$_2$, and then neutralized with 10% aqueous soda lye. The product had a degree of sulfonation of 94.7%. The Lovibond color values were: yellow: 1.2; red: 0.1; blue: 0.0.

While the invention has been described in detail with reference to certain embodiments, various changes and modifications that fall within the spirit of the invention will become apparent to the skilled artisan. The invention is, therefore, only intended to be limited by the appended claims or their equivalents wherein we have endeavored to claim all inherent novelty.

We claim:

1. In the process for the α-sulfonation of a member selected from the group consisting of fatty acids, fatty acid esters, and mixtures thereof having a substantially saturated fatty acid radical with 6 to 28 carbon atoms and being substantially free of alcoholic hydroxyl groups, the improvement which comprises initially introducing about 1.1–1.8 mols of gaseous $SO_3$ per mol of fatty acid radical to be sulfonated into said group member at a temperature below the temperature of effective sulfonation, thereafter raising the temperature to above the temperature of effective sulfonations but not in excess of about 70° C. maintaining such temperature until at least 50% of said group member has been sulfonated and thereafter increasing the temperature to at least 75° C. to substantially complete the sulfonation.

2. Improvement according to claim 1 in which the $SO_3$ is introduced into the starting material at a temperature between about 10–45° C. and in which the temperature is thereafter raised from about 45–70° C.

3. Improvement according to claim 1 in which the temperature is maintained at a value not in excess of about 70° C. until about 60–80% of the starting material has been sulfonated.

4. Improvement according to claim 1 in which the sulfonation is substantially completed at a temperature between about 75–95° C.

5. Improvement according to claim 1 in which the sulfonation is substantially completed at a temperature above about 70° C. within a period of time not exceeding about ⅓ of the entire reaction time.

6. Improvement according to claim 1 in which about 1.2–1.6 mols of sulfur trioxide per mol of fatty acid radical to be sulfonated is introduced into the starting material.

7. Improvment according to claim 1 in which the $SO_3$ is initially introduced at a temperature between about 20–35° C., the temperature is, thereafter raised to a value not exceeding about 65° C. and in which the sulfonation is completed at a temperature between about 80–90° C.

8. Improvement according to claim 4 in which the sulfonation is effected at a temperature between about 75–95° C. for a period of time not in excess of about ⅓ of the total sulfonation time.

9. Improvement according to claim 1 in which gaseous $SO_3$ is introduced, diluted with an inert gas.

References Cited in the file of this patent
UNITED STATES PATENTS
2,878,281    Little et al. _____ Mar. 17, 1959